United States Patent [19]
Sato et al.

[11] Patent Number: 4,998,413
[45] Date of Patent: Mar. 12, 1991

[54] REFRIGERANT RECOVERY SYSTEM

[75] Inventors: Hideaki Sato, Oobu; Hisao Nagashima; Kenichi Fujiwara, both of Kariya; Keiichi Kitamura, Handa, all of Japan

[73] Assignee: Nippondenso Co., Ltd., Kariya, Japan

[21] Appl. No.: 400,548

[22] Filed: Aug. 31, 1989

[30] Foreign Application Priority Data

Sep. 1, 1988 [JP] Japan .................. 63-216390
Mar. 22, 1989 [JP] Japan .................. 1-69944
Jul. 14, 1989 [JP] Japan .................. 1-183505

[51] Int. Cl.$^5$ .................................. F25B 45/00
[52] U.S. Cl. ............................ 62/149; 62/85; 62/195
[58] Field of Search ............... 62/149, 174, 195, 292, 62/85, 77

[56] References Cited

U.S. PATENT DOCUMENTS 3,145,544  8/1964  Weller ............................ 62/195
4,476,688 10/1984  Goddard ........................ 62/513 X
4,766,733  8/1988  Scuderi ......................... 62/292 X

FOREIGN PATENT DOCUMENTS 57-91305   6/1982  Japan .
57-169573 10/1982  Japan .
63-311061 12/1988  Japan .

Primary Examiner—Harry B. Tanner
Attorney, Agent, or Firm—Cushman, Darby & Cushman

[57] ABSTRACT

A refrigerant recovery system has a refrigerant recovery vessel which is connected to a refrigerant-recovered refrigeration circuit. A gaseous refrigerant in the refrigerant-recovered refrigeration system is sucked into the refrigerant recovery vessel due to the difference between the pressure in the refrigerant-recovered refrigeration circuit and the refrigerant recovery wheel. The refrigerant recovery vessel is cooled by a refrigeration circuit provided in the refrigerant recovery system, so that the sucked gaseous refrigerant is a liquified. to the refrigerant recovery vessel, a recovery tank made of a cartridge type is connected. The liquefied refrigerant from the refrigerant recovery vessel is sent to the tank. When the temperature of the recovery tank is not low enough, the liquefied refrigerant sent into the tank is evaporated and then returns to the refrigerant recovery vessel so that the refrigerant is liquefied in the vessel again. Such processes are repeated so that the temperature of the tank is gradually lowered by the liquified refrigerant sent thereto and hence the liquefied refrigerant is accumulated in the tank.

8 Claims, 15 Drawing Sheets

FIG.6
FIG.7
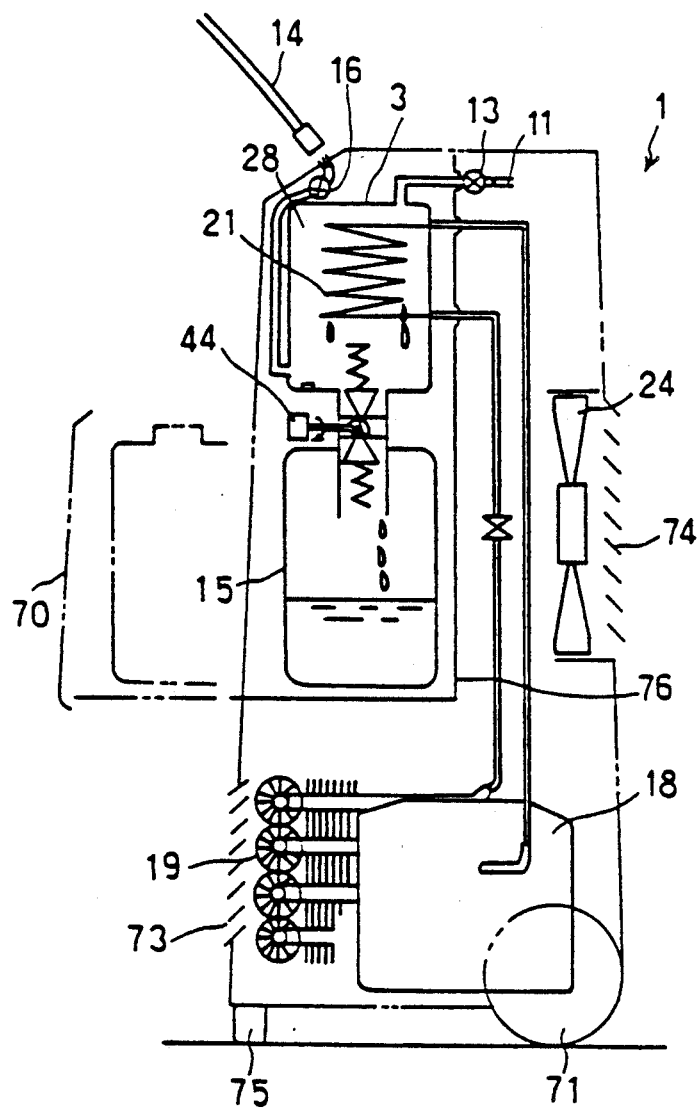
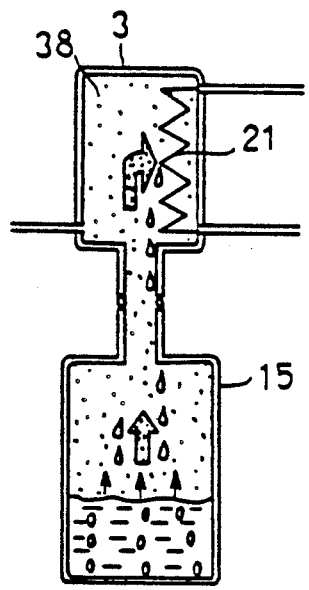

REFRIGERANT RECOVERY SYSTEM

BACKGROUND OF THE INVENTION

The present invention relates to refrigerant recovery system for recovering refrigerant from the refrigeration circuit of an air conditioner for a motor vehicle, for example, and relates to a recovery tank for the system.

There are a conventional refrigerant recovery system of the suction pump type and a conventional refrigerant recovery system of the cooling type for recovering refrigerant from refrigerant using machines. The refrigerant recovery system of the suction pump type includes a compressor so that refrigerant from a refrigerant using machine is forcibly sucked and compressed to be cooled at the room temperature so as to be recovered. Since the pressure of the refrigerant needs to be increased by the compressor and the refrigerant becomes high-pressure gas after the pressure increases, there is a problem in handling the refrigerant recovery system of the suction pump type. In the refrigerant recovery system of the cooling type, the pressure and temperature in a recovery tank are made low and a gaseous refrigerant is then liquefied. For that reason, the latter system is more advantageous in handling than the former in which the high-pressure gas is handled. In the refrigerant recovery system of the cooling type, the recovery tank is cooled by a refrigerator or a cooling means, the gaseous refrigerant is introduced into the tank so as to be cooled and liquefied, and the liquefied refrigerant is sent therefrom to a storage vessel through a recovery pump and stored in the vessel. For that reason, the system includes the recovery tank, the refrigerator, the recovery pump and the storage vessel, and therefore has a problem that the size and weight of the system are large.

SUMMARY OF THE INVENTION

The present invention is characterized in that the recovery tank of a refrigerant recovery system of the cooling type is, in order to reduce the size of device, made of the cartridge type which makes it easy to remove the tank from the system. Since the recovery tank is made of the cartridge type, the tank itself cannot directly be cooled by a cooling means but needs to be cooled to liquefy the gaseous refrigerant, a refrigerant recovery vessel is provided in addition to the tank so that the gaseous refrigerant introduced into the vessel is cooled by the cooling means and thereby liquefied and the liquefied refrigerant is sent to the tank. When the temperature of the recovery tank is not low enough, the liquefied refrigerant sent into the tank is evaporated and then returns to the refrigerant recovery vessel so that the refrigerant is liquefied in the vessel again. Such processes are repeated so that the temperature of the recovery tank is gradually lowered by the liquefied refrigerant sent thereto. In other words, the recovery tank is cooled according to a heat pipe principle so that the liquefied refrigerant is accumulated in the tank. Since the recovery tank is of the cartridge type, the tank can be replaced with another one after the recovery of the refrigerant so as to perform the next recovery of the refrigerant. If the temperature of the recovery tank removed from the refrigerant recovery system rises, the liquefied refrigerant in the tank expands. For that reason, the tank cannot be filled with the liquefied refrigerant but some space needs to be provided in the tank so as to contain the vapor of the refrigerant. For that purpose, a cylindrical guide or the like is provided in the recovery tank so that a space of prescribed volume is maintained in the tank to prevent it from being filled with the liquefied refrigerant.

BRIEF DESCRIPTION OF THE DRAWINGS

FIG. 6 is a schematic view indicative of the disposition of components of the system. FIG. 7 is an explanatory view for describing the principle of the refrigerant recovery by the system.

DETAILED DESCRIPTION OF PREFERRED EMBODIMENTS

A. REFRIGERANT RECOVERY DEVICE

Various embodiments of the present invention are hereafter described in detail with reference to the drawings attached thereto.

First Embodiment

Figure 1:
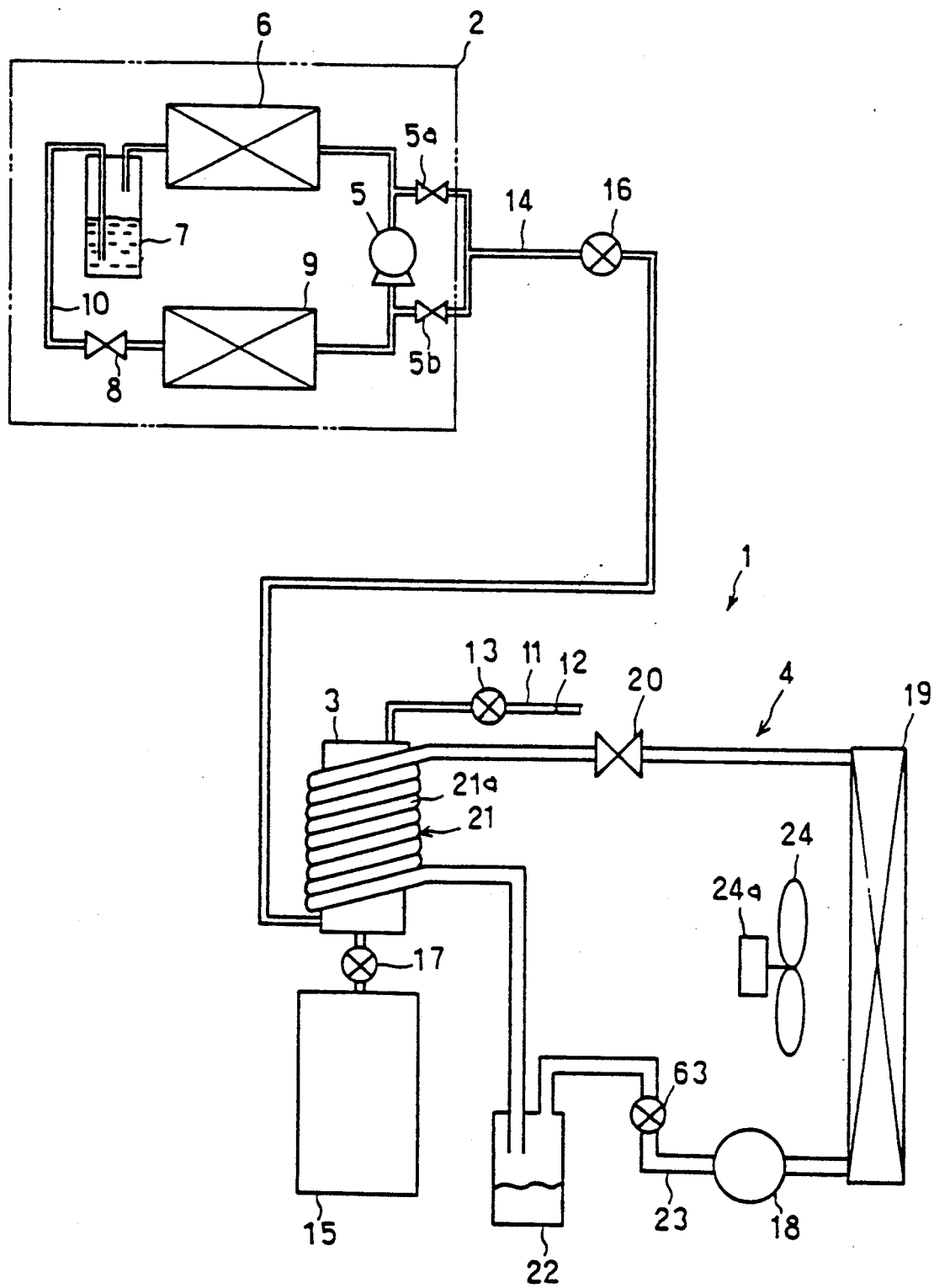
FIG. 1 is an overall structural view of a refrigerant recovery system which is an embodiment of the present invention.

FIG. 1 is an overall structural view of a refrigerant recovery system 1 connected to a refrigeration circuit 2. The refrigerant recovery system 1 includes a refrigerant recovery vessel 3 connected to the refrigerant passage of the refrigeration circuit 2, and a refrigeration circuit 4 for cooling the vessel. The refrigerant-recovered refrigeration circuit 2 is used in an air conditioner for a vehicle, for example, and includes a refrigerant compressor 5, a refrigerant condenser 6, a receiver 7, a expansion valve 8 and a refrigerant evaporator 9 which are annually connected to each other through refrigerant pipes 10. The refrigerant recovery vessel 3 is a cylindrical aluminum-made vessel, for example. An air removal pipe 11 is attached at the upstream end thereof to the top of the vessel 3 and communicates with the interior thereof. The downstream end of the air removal pipe 11 is open to the atmosphere. The pipe 11 is formed with a throttle 12 in the halfway portion of the pipe. A relieve valve 13, which is manually opened and closed, is provided in the pipe 11 upstream of the throttle 12, namely, nearer the refrigerant recovery vessel 3 than the throttle. The relief valve 13 may be constituted by a solenoid valve, which is automatically opened and closed at prescribed timing as described for the second and the third embodiments thereinafter. A charging hose 14 connects the vessel 3 to a high-pressure side service valve 5a and a low-pressure side service valve 5b which are provided at the refrigerant compressor 5 of the refrigerant-recovered refrigeration circuit 2. A recovery tank 15 for storing the recovered liquid refrigerant is connected to the bottom of the vessel 3 through a valve mechanism 17.

The refrigeration circuit 4 is a conventional accumulator circuit, and includes a refrigerant compressor 18, a refrigerant condenser 19, a throttle 20, a refrigerant evaporator 21 and an accumulator 22 which are annularly connected to each other through refrigerant pipes 23. Shown at 24 in FIG. 1 is a cooling fan which sends air to the refrigerant condenser 19. The fan 24 is driven by a motor 24a. The refrigerant evaporator 21 has a coolant passage 21a spirally wound around the refrigerant recovery vessel 3 and coupled thereto in a heat-transmitting manner. The coolant passage 21a may be located in the vessel 3 to directly cool the refrigerant therein.

The constitution of the refrigerant recovery vessel 3 and the recovery tank 15 is described with reference to FIG. 2. The tank 15 is a pressure-resistant recovery tank. A valve 30 is provided on the top plate 15a of the recovery tank 15. A cylindrical guide 31 extends downward from the top plate 15a integrally thereto to guide the valve 30 and a spring 32 urging the valve upward. The length l of the guide 31 is predetermined by calculation so that a gasphase space 33 defined by the outside surface of the guide and the inside surfaces of the tank 15 can contain a prescribed volume of the gaseous refrigerant against the weight of the liquefied refrigerant which can be contained in a liquid-phase space 34, the part except the gas-phase space 33 of the recovery tank 15. A valve seat 35 is hermetically secured to the top plate 15a by screws or the like. The top of the valve 30 is formed with a nipple-shaped projection, which is moved into the valve port of the valve seat 35 when the valve is closed. Shown at 36 is the surface of the liquefied refrigerant. A ball valve 37 is provided between the top plate 15a and the valve seat 35. A valve 39 of nearly the same constitution as the valve 30 is provided on the lower portion of the condensation chamber 38 of the refrigerant recovery vessel 3 and opposed to the valve 30. The valve 39 is urged downward by a spring 41 housed in a guide 40. A valve seat 42 is hermetically secured to the bottom of the vessel 3. The bottom of the valve 39 is formed width a nipple-shaped projection, which is moved into the valve port of the valve seat 42 when the valve is closed. A valve manipulation bar 43 is hermetically fitted in the valve seat 42 and extended horizontally toward the axis of the valve port thereof. A manipulation lever 44 is attached to the bar 43 at the outer end thereof. The bar 43 is provided with an elliptic cam 45 turnable in the valve port of the valve seat 42. The valve seats 35 and 42 are provided with openings which are located on the outside surfaces of the valve ports of the valve seats and correspond to the rotative locus of the cam 45 so that the valve seat 35 is coupled to the other valve seat 42 as described hereinafter, the cam 45 can be turned by the manipulation lever 44 to open or close the valves 30 and 39 at the same time. A guide 46 is attached to the bottom of the valve seat 42 to perform guiding to fit the top of the valve seat 35 into the recess 47 of the valve seat 42 to make the axes of the valve ports of the valve seats coincident with each other. A float switch 48 is arranged in the refrigerant recovery vessel 3 and located slightly higher than the bottom of the condensation chamber 38 thereof. At least one passage hole 49 is provided on the guide 40 at the bottom of the condensation chamber 38.

Figure 3:
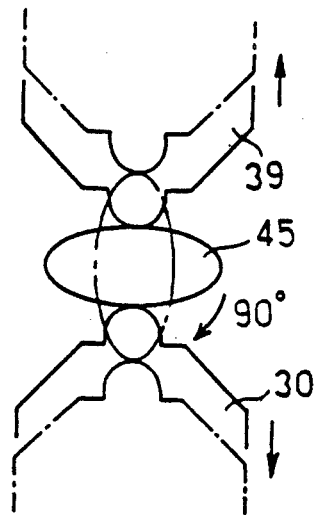
FIG. 3 is an explanatory view for describing the operation of the valves of the system.

FIG. 3 is an enlarged view of the valves 30 and 39 and the elliptic cam 45 engaged with both of them at the same time. When the lever 44 is turned by an angle of 90°, the cam 45 is put in either a full-line-shown position for closing the valves 30 and 39 or a dotted-line-shown position for opening the valves. In order to surely keep the cam in either of the positions, the bar 43 is provided with a click mechanism, the cam is cut at the ends of the major and minor axes of the elliptic section thereof, or the cam may be replaced with an oblong cam.

Figure 4:
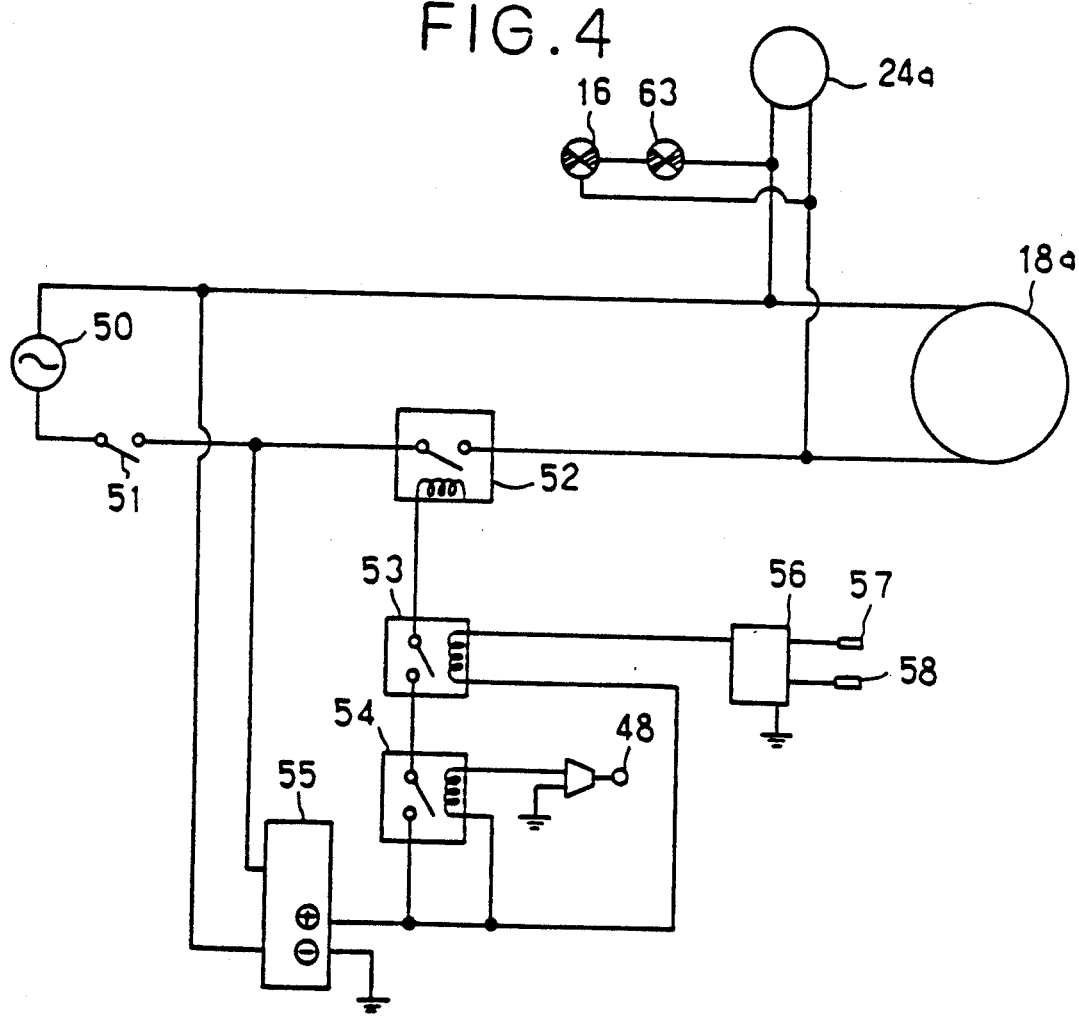
FIG. 4 is a wiring diagram of the electric circuit of the system.

FIG. 4 is a wiring diagram of the electric circuit which receives a signal from the float switch 48 to control the drive and stoppage of the compressor 18 and fan motor 24a of the refrigeration circuit 4 of the refrigerant recovery system. The electric circuit includes a motor for driving the compressor 18, a power supply 50, a main switch 51, a main relay 52, relays 53 and 54, a rectifier 55, a differential pressure switch 56, a pressure sensor 57 provided in the condensation chamber 38 to detect the condensation pressure of the refrigerant to be recovered, a pressure sensor 58 provided in the refrigerant evaporator 21 to detect the evaporation pressure of the refrigerant in the refrigeration circuit 4, a solenoid valve 16 provided on a passage for the refrigerant to be recovered, and solenoid valve 63 provided in the refrigeration circuit. Although the pressure sensors 57 and 58 and the differential pressure switch 56 are provided to find out the completion of the recovery of the refrigerant, the difference between the inlet temperature of the refrigerant evaporator 21 and the temperature of the refrigerant recovery vessel 3 may be detected to find out the completion of the recovery of the refrigerant.

Figure 5:
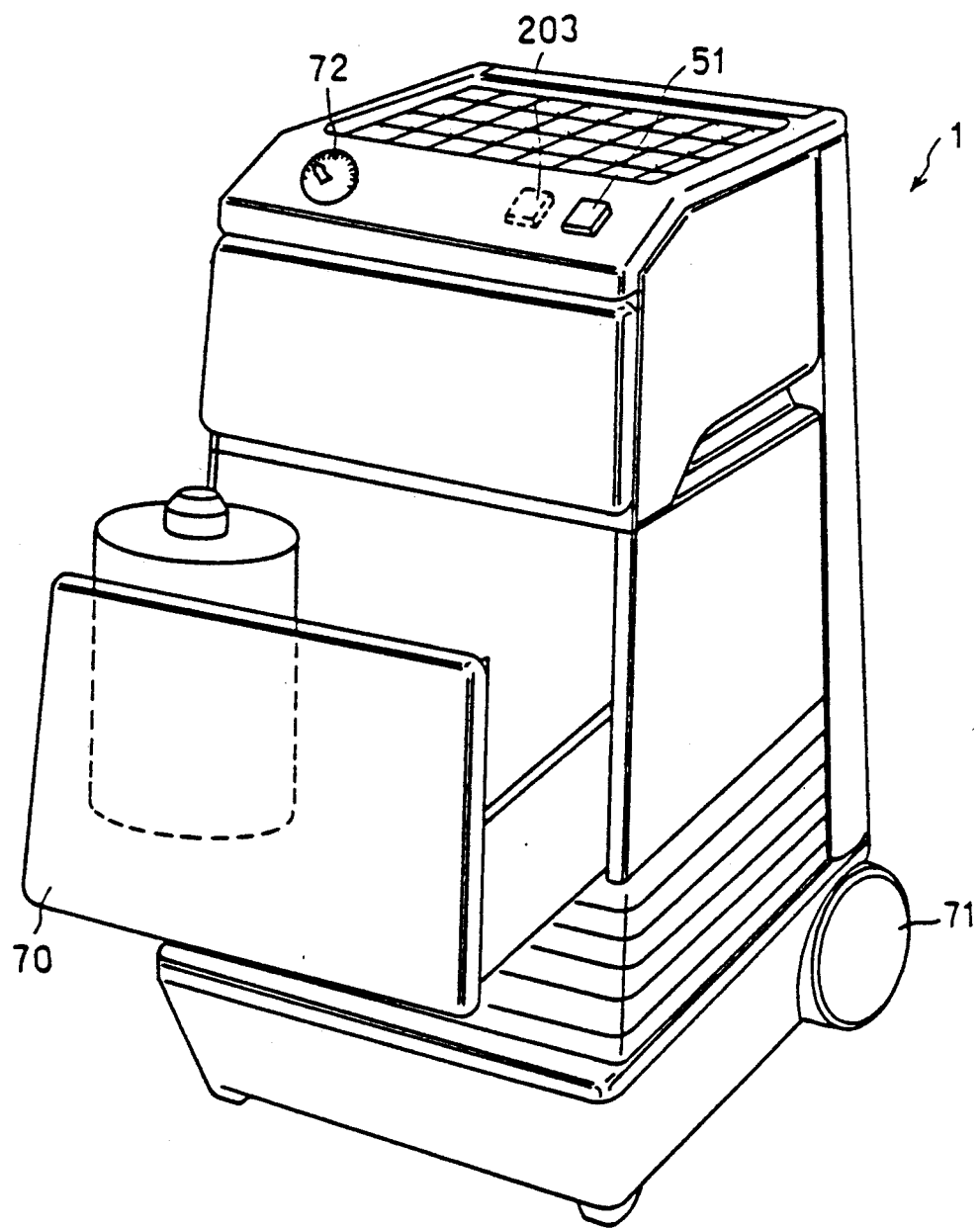
FIG. 5 is a perspective view of the system.

FIG. 5 is a perspective view of the refrigerant recovery system 1. FIG. 6 is a schematic view of the interior of the refrigerant recovery system 1. After a cover 70 is opened, the recovery tank 15 is set in the system 1 and then connected to the refrigerant recovery vessel 3 by manipulating the lever 44 and so forth. In response to the closing of the cover 70, lifting the tank 15 and opening the valves 30 and 39 by a servomotor may be automatically performed to connect the tank to the vessel 3. The system 1 has tires 71 so that the system can be moved by pushing or pulling a handle (not shown in the drawings) as the system is titled. The system 1 has support members 75 for fixing the system in a position. Air intake ports 73 are provided on the front of the system and the lower portions of the sides thereof. Air discharge portions 74 are provided on the central portion of the rear of the system 1. The refrigerant condenser 19 is cooled by air introduced through the air intake port 73. A heat insulator 76 is provided on the system 1 to prevent heat transfer between refrigeration circuit 4 and the combination of the refrigerant recovery vessel 3 and the recovery tank 15 to efficiently cool the vessel and the tank. As shown in FIG. 5, a pressure gauge 72 is provided to indicate the pressure in the vessel 3.

The operation of refrigerant recovery system 1 is described hereinafter. Before the start of running of the system 1, the recovery tank 15 is put on a vertically-movable circular base 62 and positioned so that the projection 15c of the recovery tank 15 coincides with the center thereof. 62 is support shaft of the base. After the tank 15 is positioned, a handle 61 is manipulated to lift the tank 15 so that the valve seat 35 on the top of the tank is fitted in the bottom recess 47 of the other valve seat 42 attached to the refrigerant recovery vessel 3. The valve 30 of the recovery tank 15 is made coaxial to the valve 39 of the recovery device side so that both the valve seats 35 and 42 are hermetically fitted to each other. The lever 44 is then manipulated to turn the elliptic cam 46 to the position shown by a dotted line in FIG. 3. As a result, the valves 30 and 39 are moved away from each other against the forces of the springs 32 and 41 urging the valves toward each other, so that the valve ports of the valve seats 35 and 42 are opened.

Spaces, through which the refrigerant to be recovered by the system 1 is to flow, are removed of air by a vacuum pump not shown in the drawings. The charging hose 14 is connected to the valves 5a and 5b of the refrigerant-recovered refrigeration circuit 2. The main switch 51 is then turned on so that the running of the system 1 is started. Since there is no liquefied refrigerant in the condensation chamber 38 at the start of the running of the system 1, the float switch 48 is out of action so that the contacts of the relay 54 remain in touch with each other. Also, the differential pressure switch 56 is out of action so that the contacts of the relay 53 remain in touch with each other. For that reason, the main relay 52 is energized so that the compressor motor 18 and fan motor 24a of the refrigeration circuit 4 of the system 1 are driven. As a result, the refrigerant of the refrigeration circuit 4 is sent to the refrigerant evaporator 21 to cool the condensation chamber 38. The refrigerant of the refrigerant-recovered refrigeration circuit 2 is sucked into the condensation chamber 38 due to the difference between the pressure in the circuit 2 and that in the chamber 38. The refrigerant sucked into the condensation chamber 38 is condensed and liquefied due to cooling therein so that the liquefied refrigerant gravitates into the recovery tank 15 though the passage hole 49 and the valves 39 and 30 and is accumulated in the recovery tank 15. When the temperature in the recovery tank 15 is high in the beginning, the liquefied refrigerant having dropped thereinto is evaporated and then flows back into the condensation chamber 38 of the refrigerant recovery vessel 3. However, the temperature in the recovery tank 15 falls along with the progress in the dropping of the liquefied refrigerant into the tank, so that the evaporated quantity of the liquefied refrigerant in the tank decreases. Therefore, the accumulated quantity of the liquefied refrigerant in the recovery tank 15 increases gradually. In other words, the cooling temperature of the condensation chamber 38 acts to lower the temperature of the condensation chamber 38 acts to lower the temperature in the recovery tank 15 through the medium of the liquefied refrigerant, with a heat pipe principle, so that the liquefied refrigerant is accumulated in the recovery tank 15.

Figure 2:
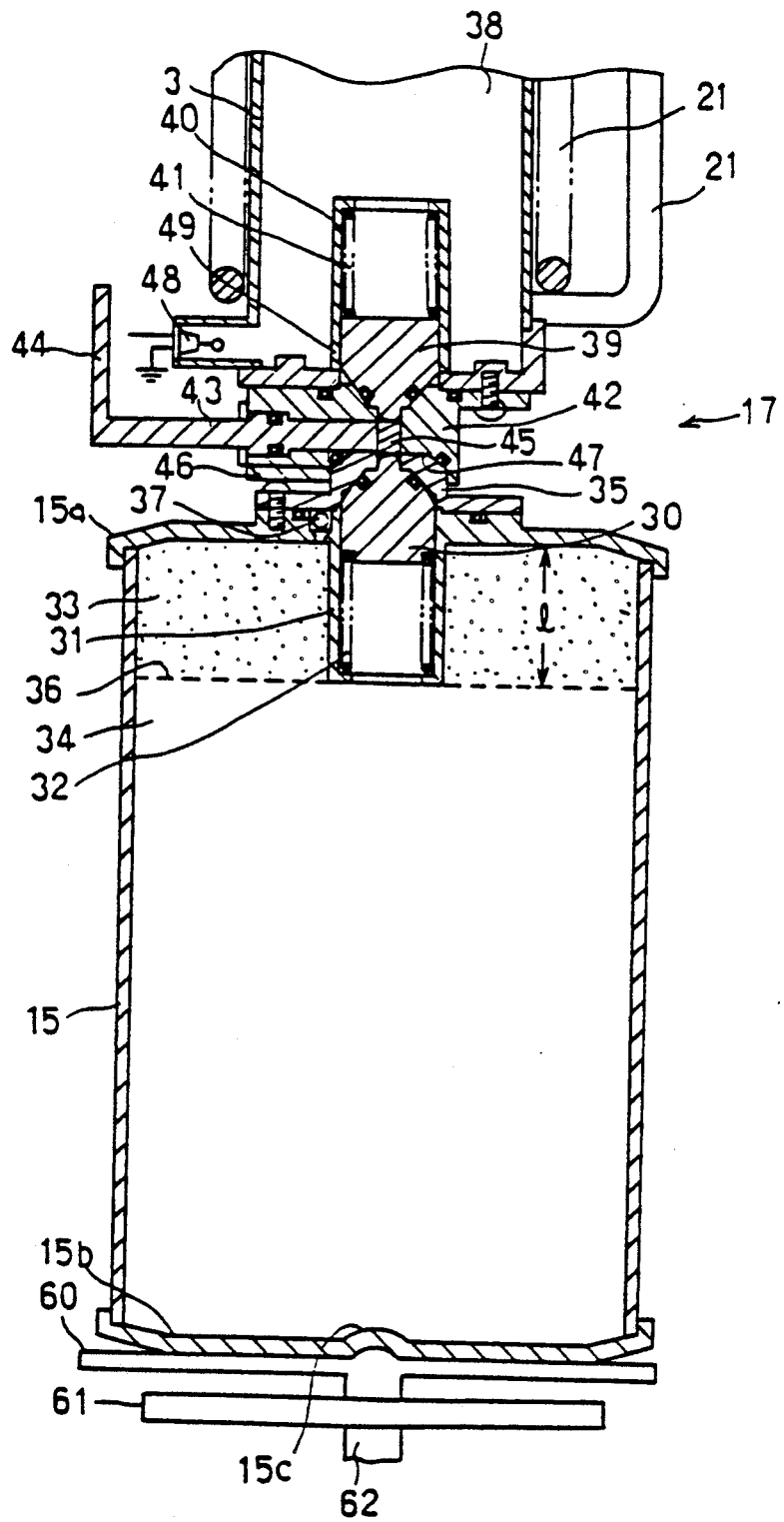
FIG. 2 is a detailed sectional view indicative of the constitution of the refrigerant recovery vessel and recovery tank of the system.

When the surface 36 of the liquefied refrigerant in the recovery tank 15 reaches a level shown in FIG. 2, the gas-phase space 33 corresponding to the length l of the guide 31 is filled with the re-evaporated refrigerant so that the liquefied refrigerant cannot enter the recovery tank 15 any more. For that reason, the liquefied refrigerant accumulates on the bottom of the condenser chamber 38 of the recovery vessel 3. When the surface of the liquefied refrigerant accumulated in the bottom of the chamber 38 has risen slightly, the float switch 48 is put into action so that the contacts of the relay 54 are put out of touch with each other. As a result, the main relay 52 disconnects a power line to stop the compressor 18 and fan 24 of the refrigeration circuit 4 of the refrigerant recovery system 1 and close recovered refrigerant passages by the solenoid valves 16 and 63. In other words, the running of the system 1 is thus automatically stopped. A prescribed quantity of the recovered refrigerant is thus automatically filled into the recovery tank 15. If the liquefied refrigerant is not filled into the recovery tank 15, the differential pressure switch 56 acts to automatically terminate the recovery of the refrigerant.

The lever 44 is thereafter turned by an angle of 90° so that the valves 30 and 32 are closed at the same time. The handle 61 is then manipulated to move down the recovery tank 15. All handling for the recovery of the refrigeration is thus completed.

Second embodiment

Figure 8:
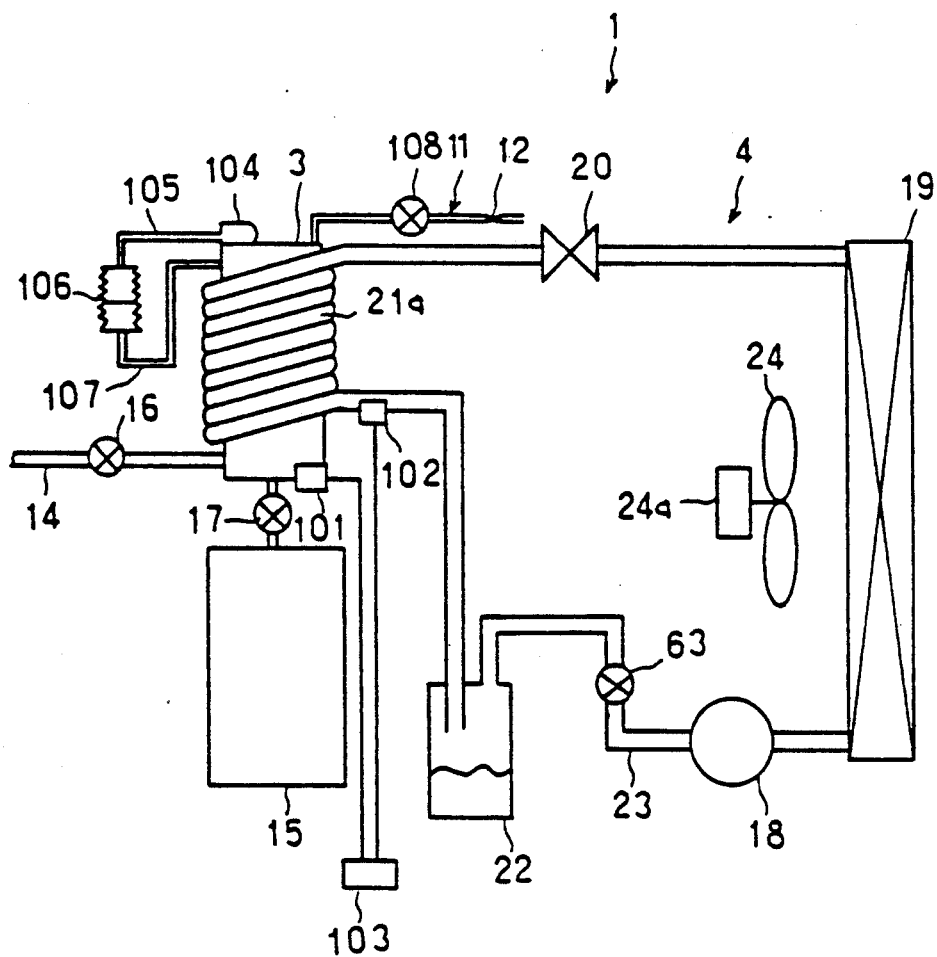
FIG. 8 is a structural view of a refrigerant recovery system which is another embodiment of the present invention.

FIG. 8 is a structural view of a refrigerant recovery system 1 which is another embodiment, and is the same in basic constitution and operation as the first embodiment except that air is automatically removed from the interior of a refrigerant recovery vessel 3 in the first embodiment. In the system 1 shown in FIG. 8, a temperature sensor 101 for detecting the temperature of the recovery vessel 3 and is provided on the lower portion of the vessel, and another temperature sensor 102 for detecting the temperature of a refrigerant flowing out from a refrigerant evaporator 21 is provided on the outlet pipe of the evaporator. The temperature sensor 102 may be provided in the inlet pipe of the evaporator 21. The sensors 101 and 102 are connected to a differential temperature switch 103, which is turned on when the difference T1 - T2 between the temperatures T1 and T2 detected by the sensors 101 and 102 is less than 10° C. (T1 - T2 < 10° C.).

A thermosensitive cylinder 104 hermetically containing a gaseous refrigerant such as an R12 refrigerant which is the same kind as a refrigerant in the refrigeration circuit 4 of the system 1 is attached to the top of the recovery vessel 3 in contact therewith so that heat is transmitted between the cylinder 104 and the vessel 3. The change in the pressure in the cylinder 104 is applied to one side of a differential pressure switch 106 through a capillary tube 105. The pressure in the refrigerant recovery vessel 3 is applied to the other side of the switch 106 through a capillary tube 107. The switch 106 is for judging whether air has flowed by a predetermined value into the refrigerant recovery vessel 3 or not. The switch 106 is turned on when the pressure in the vessel 3 has exceeded that in the cylinder 104.

Figure 9:
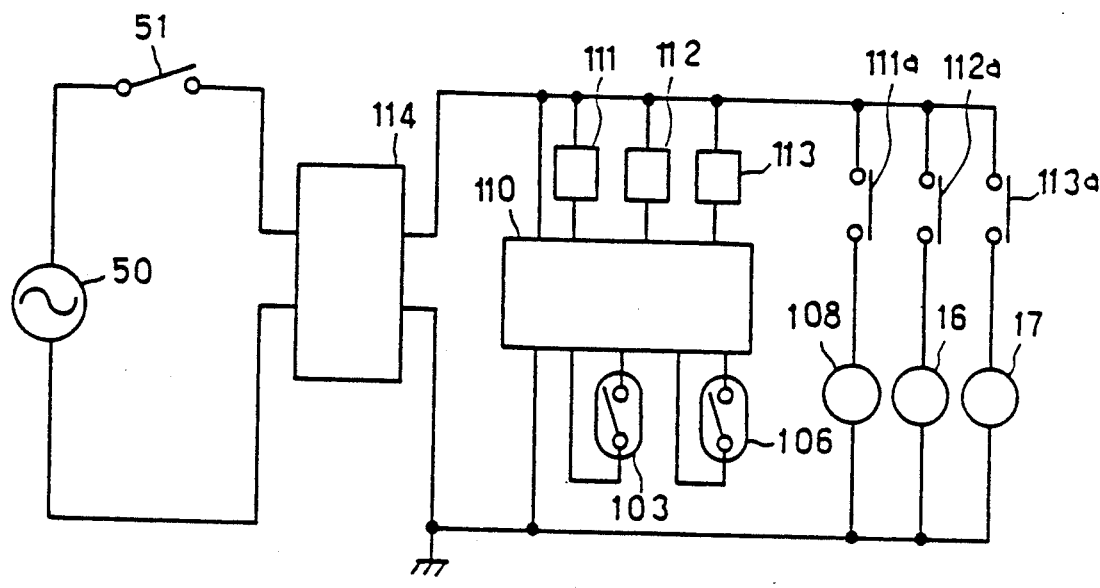
FIG. 9 is a wiring diagram of the electric circuit of the system shown in FIG. 8.

The system 1 includes an electric circuit 110 shown in FIG. 9. When a main switch 51 is turned on, the control circuit 110 is put into action so that the electric energizing of a relief valve 108 and solenoid valves 16 and 17, which are opened or closed in accordance with electric signals, is controlled through relay coils 111, 112 and 113 and relay switches 111a, 112a and 113a on the basis of the output signals from the differential temperature switch 103 and the differential pressure switch 106. The valves 108, 16 and 17 are opened when they are electrically energized. Shown at 114 in FIG. 9 is a rectifier which converts AC current to DC current.

Figure 10:
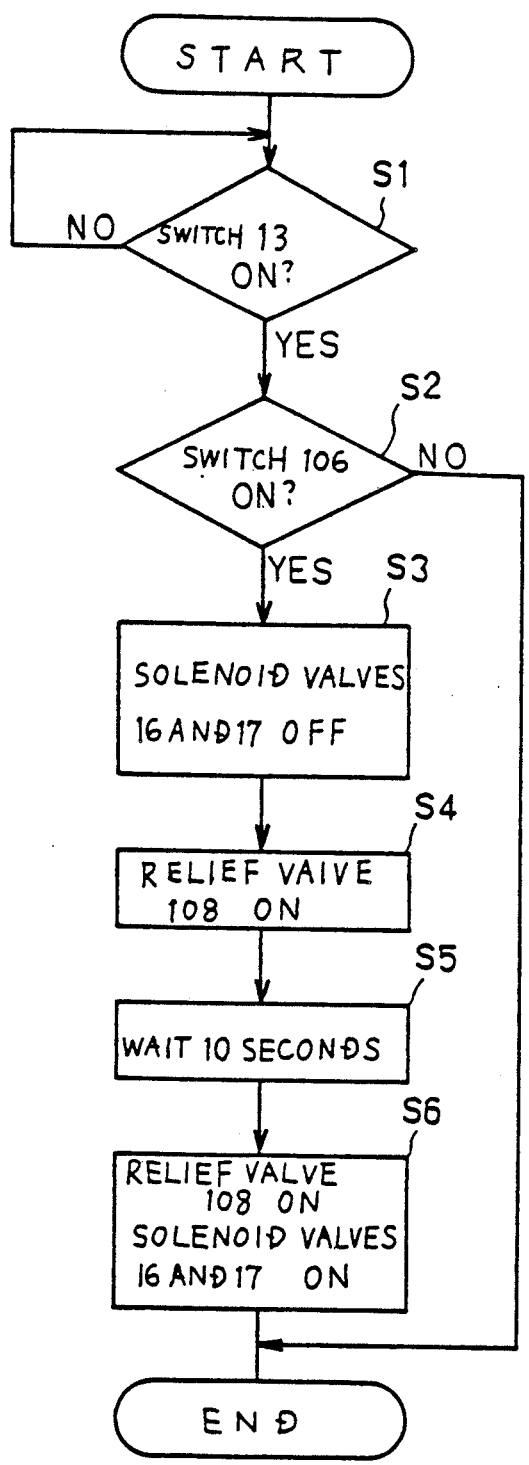
FIG. 10 is a flow chart of the air removal control operation of the control circuit of the system shown in FIG. 8.

The removal of the air from the recovery vessel 3 under the control action of the control circuit 110 is described from now on, with reference to a flow chart shown in FIG. 10. In a step S1, it is judged whether the differential temperature switch 103 is turned on or not. If it is judged in the step S1 that the switch 103 is not turned on, the step is taken again. After it is judged in the step S1 that the switch 103 is turned on, it is judged in a step S2 whether the differential pressure switch 106 is turned on or not. If it is judged in the step S2 that the switch 106 is not turned on, the control action is terminated. If it is judged in the step S2 that the switch 106 is turned on, the energizing of the solenoid valves 16 and 17 is stopped and a step S4 is taken. In the step S4, the relief valve 108 is energized. Ten seconds are thereafter spent in a step S5. After that, the energizing of the relief valve 108 is stopped and the solenoid valves 16 and 17 are energized.

The operation of the refrigerant recovery system 1 shown of the second embodiment is described hereinafter. The main switch 51 is turned on to electrically energize the solenoid valves 16 and 17 so that a gaseous refrigerant flows from a refrigerant-recovered refrigeration circuit 2 into the refrigerant recovery vessel 3 removed of the air in advance. The refrigeration circuit 4 of the system 1 begins to act to transfer the heat of the gaseous refrigerant in the vessel 3 to the refrigerant sent into a refrigerant evaporator 21 and low in temperature and pressure. As a result, the gaseous refrigerant in the vessel 3 is condensed and liquefied so that the liquefied refrigerant drops into a refrigerant recovery tank 15 and is accumulated therein. If air having entered into the refrigerant-recovered refrigeration circuit 2 flows into the recovery vessel 3, the pressure in the vessel 3 becomes higher than the saturation pressure of the refrigerant at the temperature therein by the pressure of the air. For that reason, the recovered quantity of the refrigerant decreases according as the quantity of the air in the recovery vessel 3 increases. In that case, the refrigeration capacity of the refrigerant evaporator 21 becomes so excessive that the recovery vessel 3 is cooled by the low-temperature refrigerant flowing through the refrigerant passage 21a of the evaporator 21. As a result, the temperature T1 detected by the temperature sensor 101 falls. When the difference between the temperature T1 and that T2 detected by the other temperature sensor 102 has become less than 10° C., the differential temperature switch 103 is turned on. The switch 103 is for setting the timing of the detection of the air by the differential pressure switch 106 so that the switch 106 is not turned on by the small amount of the air having flowed into the recovery vessel 3. When the differential temperature switch 103 is turned on, the control action of the control circuit 110 for the detection of the air is started. The differential pressure switch 106 is turned on due to the inflow of the air to the recovery vessel 3 to stop the energizing of the solenoid valves 16 and 17 to confine the air in the vessel. After that, the relief valve 108 is energized to be opened so that the air accumulated in the upper portion of the interior of the vessel 3 is removed therefrom through an air removal pipe 11. After the removal of the air is performed for ten seconds, the relief valve 108 is closed and the solenoid valves 16 and 17 are opened so that the recovery of the refrigerant from the refrigerant-recovered refrigeration circuit 2 is resumed. The removal of the air is thus performed during the recovery of the refrigerant so that the gaseous refrigerant can be introduced into the recovery vessel 3 again. For that reason, the recovery of the refrigerant is kept from becoming impossible, and the time of the recovery is prevented from being much lengthened.

Although the differential pressure switch 106 is arranged in the second embodiment so as to detect the air, switch 106 is not necessarily provided, and the electric energizing or the relief valve 108 and solenoid valves 16 and 17 may be controlled at the time of the turning-on of the differential temperature switch 103 so as to remove the air.

Third embodiment

Figure 11:
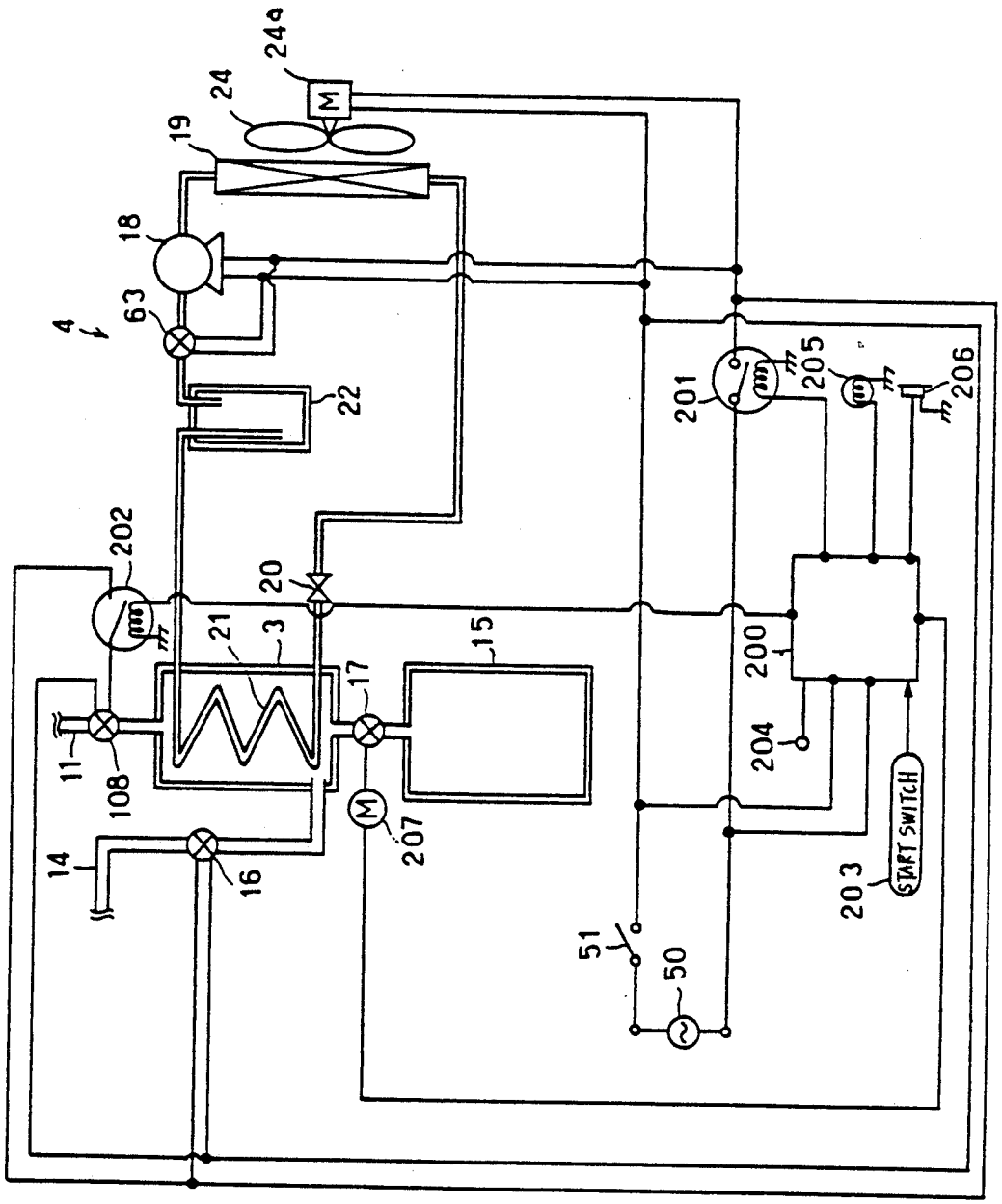
FIG. 11 is a wiring diagram of the electric circuit of a refrigerant recovery system which is yet another embodiment of the present invention.
Figure 12:
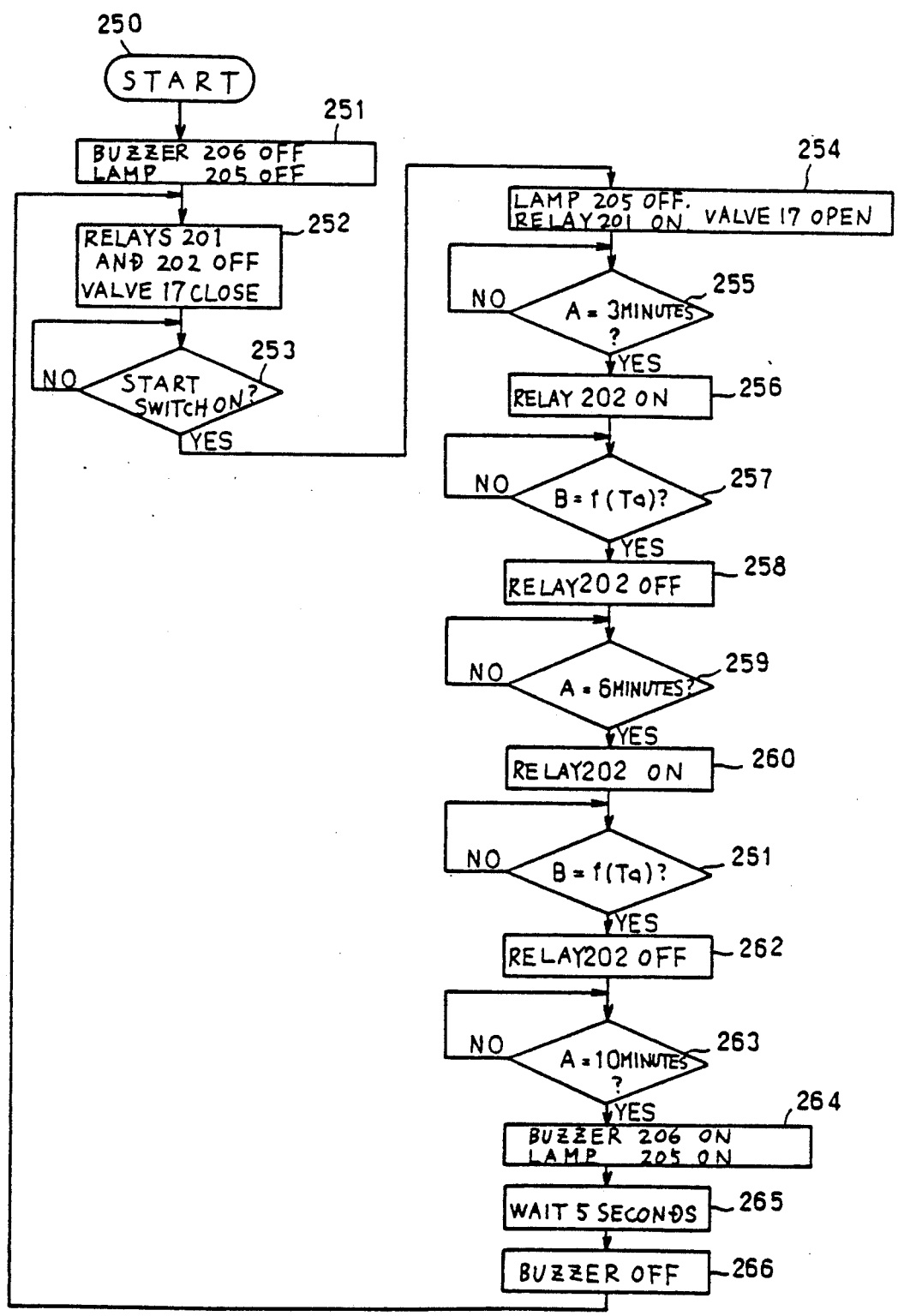
FIG. 12 is a flow chart of the operation of the control circuit of the system shown in FIG. 11.

FIG. 11 is a structural view of a refrigerant recovery system which is yet another embodiment and is the same in basic constitution and operation as the second embodiment except that a timer is provided instead of the differential temperature switch 103 and the differential pressure switch 106 so as to periodically remove air, another timer is provided to automatically terminate the recovery of refrigerant, and the control of the opening and closing of a relief valve 108 which is opened and closed in accordance with electric signals similarly to the second embodiment, and the control of a servomotor 207 for opening and closing a valve 17 are performed. As shown in FIG. 11, the system includes a control circuit 200 which is supplied with electric power to control the recovery of the refrigerant as shown in FIG. 12. The circuit 200 comprises a microcomputer which performs digital operation. The circuit 200 includes a rectifier for changing the AC power from a power supply 50 into DC power, and an A/D converter for changing an analog signal from an ambient temperature sensor 204 into a digital signal. A normally open relay 201 acts to supply electricity to run the refrigeration circuit 4 of the system 1. A normally open relay 202 acts to open or close the air-removing relief valve 108. A start switch 203 is provided near the main switch 51 as shown in FIG. 5. The ambient temperature sensor 204 for detecting the temperature of air outside the system 1 is provided near the air intake port 73 shown in FIG. 6. A termination lamp 205 and a buzzer 206 are provided to notify the termination of the refrigerant recovery.

The operation of the refrigerant recovery system shown in FIG. 11 is described hereinafter, with reference to a flow chart shown in FIG. 12 indicative of the operation of the control circuit 200. When the main switch 51 is turned on, the circuit 200 is supplied with the power from the power supply 50 so that the operation of the circuit is started from a step 250. In a step 251, the initial setting of turning off the termination lamp 205 and the buzzer 206 is performed. In a step 252, the relays 201 and 202 are turned off, and the servomotor 207 is driven to close the valve 17. In a step 253, judging whether the start switch 203 is turned on or not, namely, waiting for the switch to be turned on is performed. When the start switch 203 is turned on to begin to recover the refrigerant, it is judged in the step 253 that the start switch is turned on. An step 254 is thereafter taken so that the termination lamp 205 is turned off, the relay 201 is turned on and the servomotor 207 is driven to open the valve 17. The turning-off of the lamp 205 means that the lamp is turned off when the second refrigerant recovery is started sequentially. Because of the turning-on of the relay 201, electricity is applied from the power supply 50 to the refrigeration circuit 4 to begin to run the circuit so that the refrigerant recovery vessel 3 of the system 1 starts being cooled. It is thereafter judged in a step 255 whether or not a timer A, which is included in the control circuit 200 so as to start timer operation at the time of the turning-on of the start switch 203 and indicates the period of time having passed since the start of the refrigerant recovery, has performed the timer operation for three minutes. If three minutes have passed since the turning-on of the start switch 203, it is judged YES in the step 255, and the relay 202 is then turned on in a step 256 to open the relief valve 108 thereby to remove the air from the interior of the refrigerant recovery vessel 3. The removal of the air is performed for a time of seconds determined as follows:

$$t = f(Ta) = 45 - \tfrac{3}{8} \times Ta$$

In the above equation, Ta denotes the ambient temperature (° C.) detected by the ambient temperature sensor 204. The time of t seconds is measured by the timer B included in the control circuit 200. The timer B starts the measurement when the relay 202 is turned on. When the time of t seconds determined according to the equation has passed, the result of the judgement in a step 257 becomes YES and a step 258 is then taken to turn off the relay 202 to terminate the first air removal. The recovery of the refrigerant through the cooling of the refrigerant recovery vessel 3 is still performed during the air removal. Since the air in the vessel 3 accumulates in the upper portion thereof and the gaseous refrigerant sucked into the vessel is located in the lower portion thereof, the air is released into the atmosphere at the time of the opening of the relief valve 108. After the first air removal is terminated, it is judged in a step 259 whether or not six minutes have passed since the start of the recovery of the refrigerant. After it is judged in the step 259 that the six minutes have passed since then, the relay 202 is turned on in a step 260 to perform the second air removal. The operation of this second air removal is continued during the time determined by the above-described equation. When the time has passed, the result of the judgement in a step 261 becomes YES and a step 262 is then taken to turn off the relay 202 to terminate the second air removal.

After that, it is judged in a step 263 whether or not ten minutes have passed since the start of the refrigerant recovery. If it is judged in the step 263 that the ten minutes have passed since then, the recovery of refrigerant is regarded as terminated and the buzzer 206 and the termination lamp 205 are then turned on in a step 264. After waiting for five seconds is performed in a step 265, the buzzer 206 is turned off in a step 266. Therefore, the buzzer 206 buzzes for five seconds. A step 252 is thereafter taken so that the relays 201 and 202 are turned off and the servomotor 207 is driven to close the valve 17. As a result, the supply of electricity to the refrigeration circuit 4 is stopped so that the running thereof is ended. However, the termination lamp 205 remains lit to notify the termination of the first refrigerant recovery. Besides, the control circuit 200 goes back to the step 253 to wait for the second refrigerant recovery to begin. Thus, as for the third embodiment, the recovery of the refrigerant is performed for ten minutes based on the confirmation, through an experiment and so forth, that the refrigerant of a refrigeration circuit for a motor vehicle can be almost all recovered in ten minutes and the removal of the air is performed for the time determined by the ambient temperature Ta at each lapse of three minutes and six minutes since the start of the refrigerant recovery.

B: Refrigerant recovery device

Figure 13:
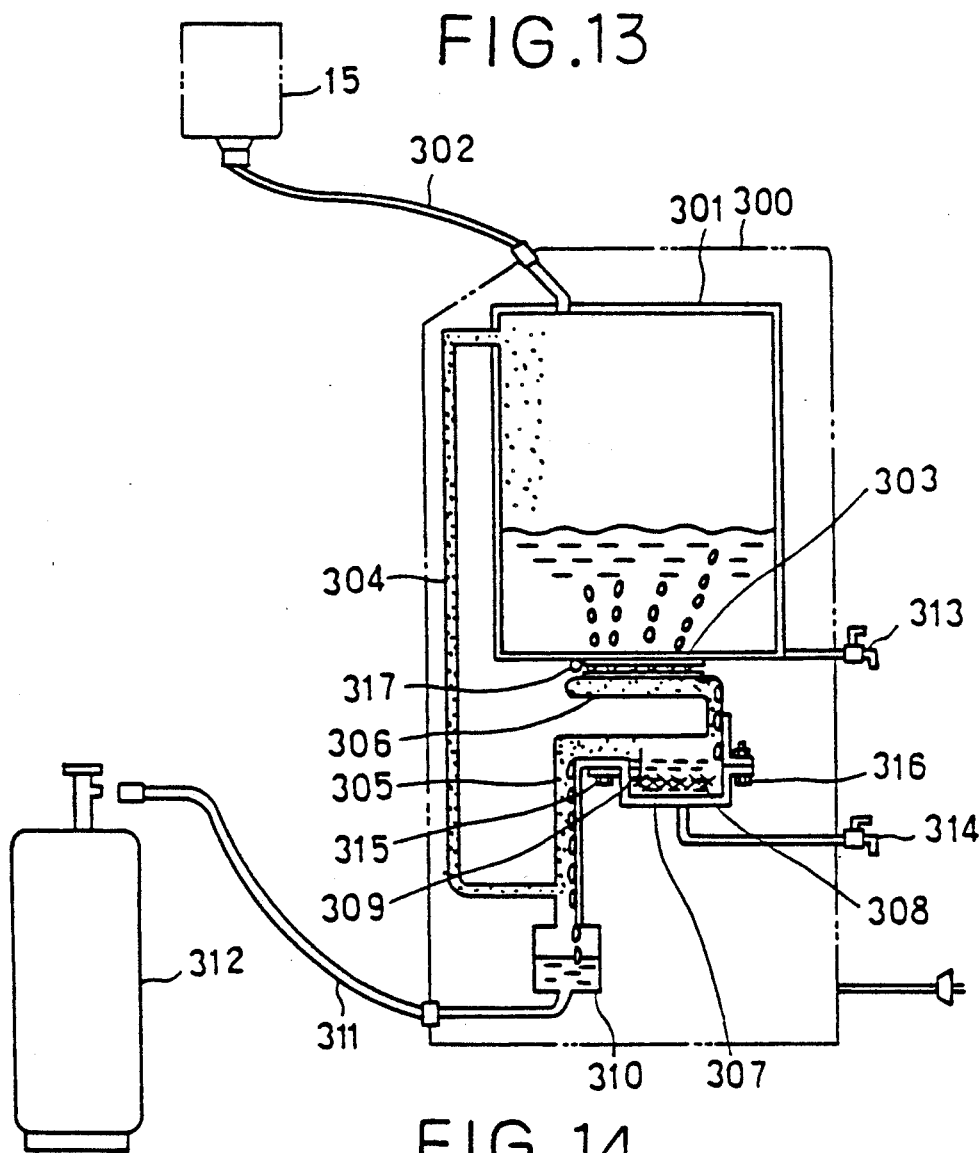
FIG. 13 is a structural view of a refrigerant reclaim system which is yet another embodiment of the present invention.
Figure 14:
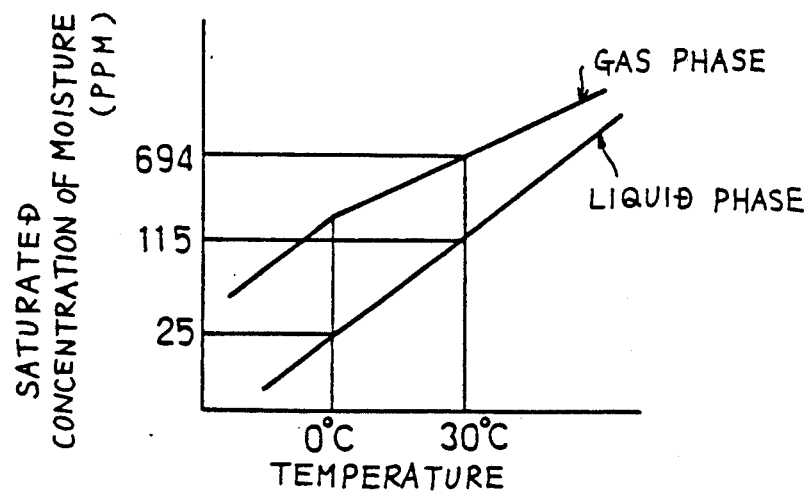
FIG. 14 is a graph indicative of the saturated concentrations of moisture in the liquid and gas phases of refrigerant along with the temperature thereof.

FIG. 13 is a schematic view of a refrigerant reclaim system 300 which is yet another embodiment. A tank 301 is provided in the system 300 so that the recovered liquefied refrigerant in the recovery tank 15 recovered by the refrigerant recovery system 1 which is the first, second or third embodiment or the like is introduced into the tank 301 through a hose 302. The heating surface of a thermoelectric element 303 is attached to the bottom of the tank 301 in contact therewith so that when electricity is applied to the element, the bottom of the tank is heated to evaporate the liquefied refrigerant in the tank 301 for reclaimer. The evaporated refrigerant flows to the liquefying section 306 through pipes 304 and 305. The top of the liquefying section 306 is in contact with the cooling surface of the thermoelectric element 303 so that the evaporated refrigerant in the liquefying section is liquefied by the cooling action of the element. The efficiency at the heating surface of the element 303 is increased by cooling action on the liquefying section 306. The refrigerant liquefied in the section 306 is accumulated in a reception plate 307 in which fiberglass 308, that may be replaced with felt, a drying agent or the like, is provided to remove separated moisture from the liquefied refrigerant. Since the moisture is smaller in specific weight than the liquefied refrigerant, the moisture is accumulated in the upper portion of the reception plate 307. For that reason, a partition plate 309 is provided so that the refrigerant removed of the moisture by the fiberglass 308 is returned into the pipe 305. In the pipe 305, the moisture in the liquefied refrigerant is moved from the liquid phase to the gas phase so that the concentration of the moisture in the liquefied refrigerant is lowered. As shown in FIG. 14, the saturated concentration of the moisture in the refrigerant in the gas phase differs from that in the liquid phase. In other words, the evaporated refrigerant can contain more moisture than the liquefied refrigerant. Because of that fact, the moisture is transferred depending on saturated concentration difference between the liquefied and the evaporated refrigerants come into contact with each other in the pipe 305. The liquefied refrigerant with the moisture lower than the saturated concentration therein is thus accumulated in a liquid reservoir 310 from which the liquefied refrigerant is sent to a large sized container 312 through a hose 311 so that the refrigerant is stored in the large-sized container 3, 12.

The refrigerant reclaim system 300 has an oil takeout port 313 and a moisture takeout port 314. Oil contained in the liquefied refrigerant is accumulated in the tank for reclaimer 301 due to the evaporation of the liquefied refrigerant therein. The oil accumulated in the tank for reclaimer 301 is taken out therefrom by manipulating the oil takeout port 313. Water separated from the refrigerant and accumulated in the reception plate 307 is taken out therefrom by manipulating the moisture takeout port 314. The fiberglass 308 in the reception plate 307 can be replaced by removing screws 315 and 316 which hermetically secures the reception plate 307. A temperature sensor 317 is attached to the bottom of the tank 301 for reclaimer near the thermoelectric element 303 to detect the temperature on the bottom of the tank. A signal is sent from the sensor 317 to a control circuit 320 which regulates the electric energizing of the thermoelectric element 303.

Figure 15:
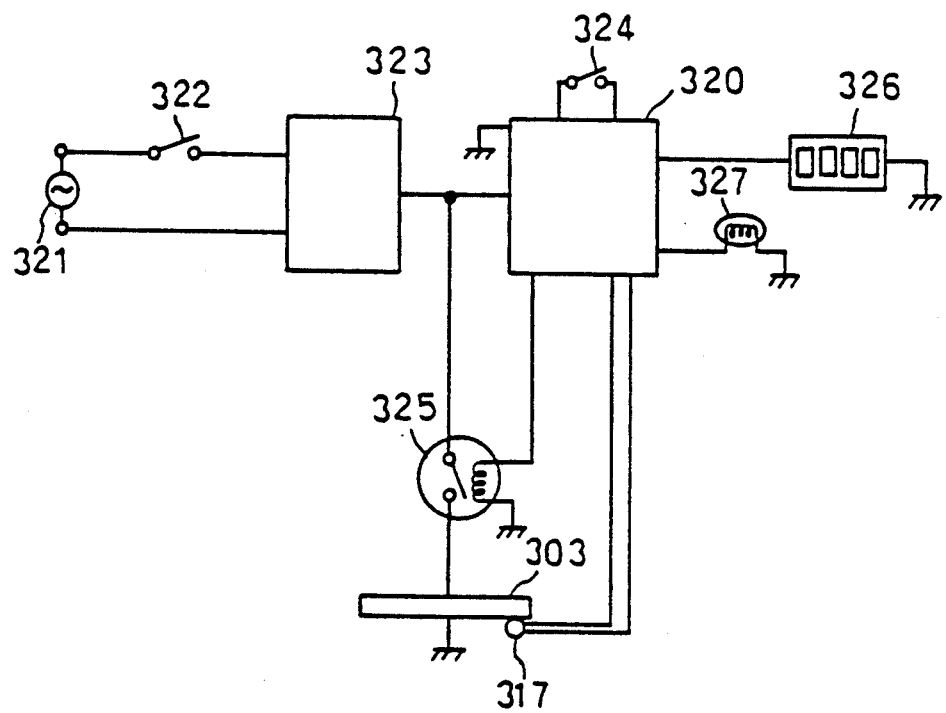
FIG. 15 is a wiring diagram of the electric circuit of the refrigerant reclaim system.

FIG. 15 is a wiring diagram of the electric circuit of the refrigerant reclaim system 300. When the control circuit 320 is supplied with DC power from a rectifier 323 which rectifies AC power supplied from a power supply 321 through a main switch 322, the control circuit starts its control action to regulate the electric energizing of the thermoelectric element 303 while receiving signals from a start switch 321 and the temperature sensor 317. In order to electrically energize the element 303, a normally opened relay 325 is turned on. A counter 326 and a termination lamp 327 are connected to the control circuit 320. The main switch 322, the start switch 324 and the counter 326 are provided on the top of the case of the system 300.

Figure 16:
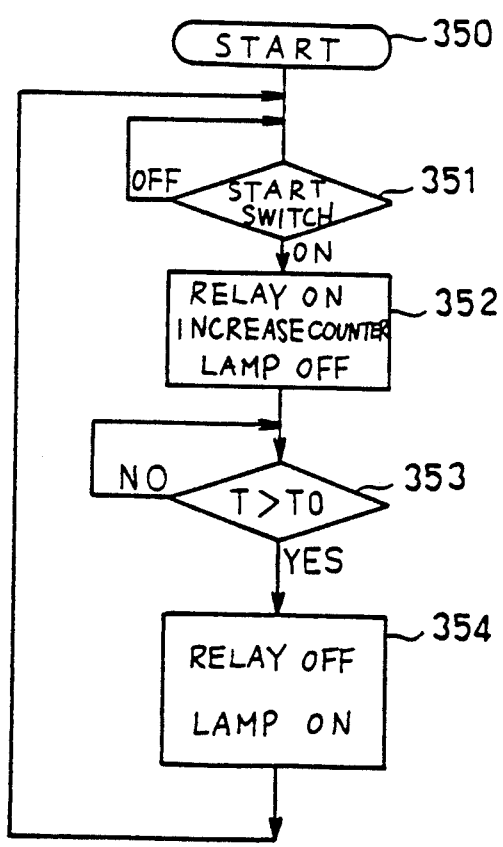
FIG. 16 is a flow chart of the operation of the control circuit of the refrigerant reclaim system.

FIG. 16 is a flow chart indicative of the operation of the control circuit 320. When the main switch 322 is turned on, the control circuit 320 is supplied with the power from the rectifier 323 so that the circuit starts its operation from a step 350 shown in FIG. 16. In the step 351, it is judged whether the start switch 324 is turned on or not. A stand-by state is maintained until the start switch 324 is turned on. After the start switch 324 is turned on to reclaim the refrigerant, a step 352 is taken so that the relay 325 is turned on, the counter 326 is caused to increase its count by one, and the termination lamp 327 is turned off. As a result, the energizing of the thermoelectric element 303 is started to heat the tank 301 for reclaimer. The counter 326 indicates the number of times of refrigerant reclaim so as to give a hint on when the fiberglass 308 should be replaced. In a step 353, it is judged whether the temperature T, which is detected by the sensor 317, has exceeded a set level T0, for example, 50° C. When the liquefied refrigerant is in the tank 301, the temperature of the bottom of the tank 301 for reclaimer is relatively low. If the liquefied refrigerant in the tank 301 for reclaimer is all evaporated, the temperature of the bottom of the tank rises. When the temperature T has exceeded the set level T0, the reclaim of the refrigerant is regarded as terminated and the result of the judgement in the step 353 becomes YES. In a step 354, the relay 325 is turned off to complete the refrigerant reclaiming action 300 and light the termination lamp 327.

C: Refrigerant recovery and reclaim device

Figure 17:
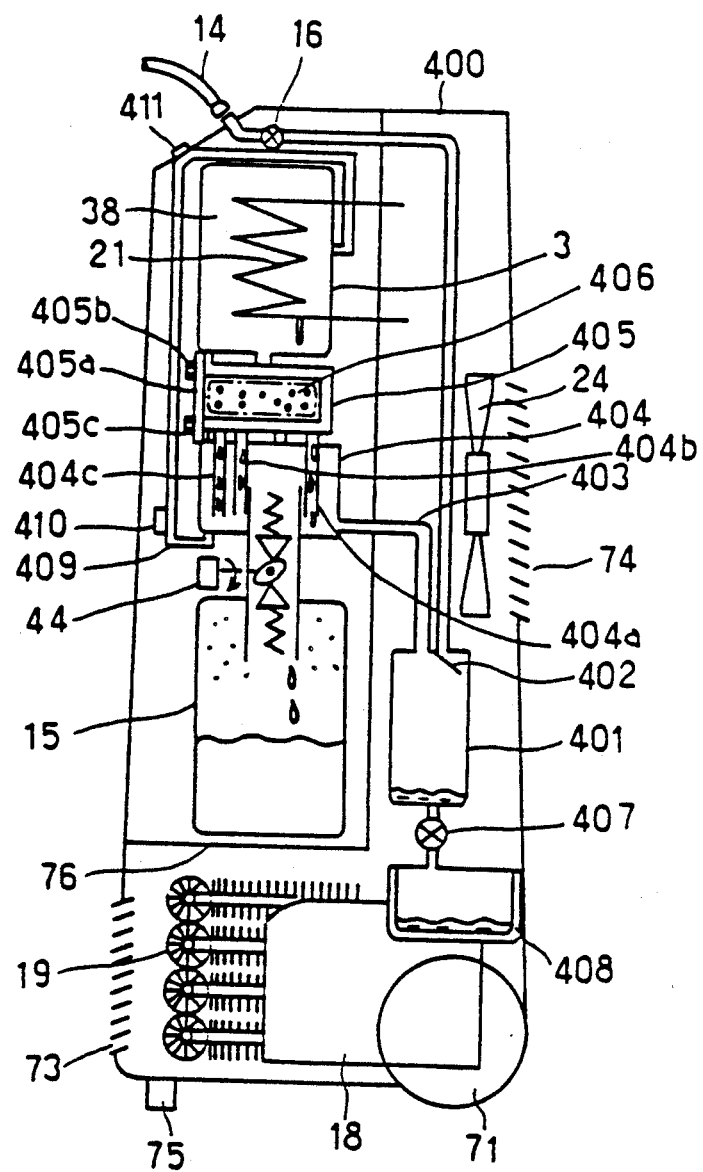
FIG. 17 is a schematic view indicative of the constitution of a refrigerant recovery and reclaim system which is yet another embodiment of the present invention.

Refrigerant recovery and reclaim device is described thereinafter. FIG. 17 is a schematic view of a refrigerant recovery and reclaim system 400 which is yet another embodiment. The system 400 comprises such a refrigerant recovery system as shown in FIG. 6, and a refrigerant reclaim system. The same reference symbols in FIGS. 6 and 17 denote the same portions. In FIG. 17, a refrigerant is sucked from such a refrigerant recovered refrigeration circuit 2 - as shown in FIG. 1 - into an oil separator 401 through a charging hose 14 so that oil contained in the refrigerant sucked into the separator is separated from the refrigerant by using an oil separation plate 402. The refrigerant thus removed of the oil flows into a moisture exchange chamber 404 through a pipe 403 and then flows into a moisture separation chamber 405 through pipes 404a, 404b and 404c therein. A drying member 406 consisting of felt and a drying agent is provided in the moisture separation chamber 405 so that the refrigerant from the moisture exchange chamber 404 is removed of moisture by flowing through the drying member 406. The refrigerant removed of moisture flows into the condensation chamber 38 of a refrigerant recovery vessel 3 and is then cooled by a refrigerant evaporator 21 so that the refrigerant is liquefied in the same manner as the above-described refrigerant recovery system. The refrigerant liquefied in the condensation chamber 38 is removed of separated moisture by the drying member 406 in the moisture separation chamber 405 and then enters the moisture exchange chamber 404 through the pipes 404a, 404b and 404c. At that time, moisture exchange takes place between the evaporated refrigerant flowing from the oil separator 401 into the moisture exchange chamber 404 and the liquefied refrigerant flowing from the moisture separation chamber 405, so that the moisture content of the liquefied refrigerant in the moisture exchange chamber 404 is reduced. The liquefied refrigerant of the reduced moisture content is accumulated in a recovery tank 15. Therefore, the refrigerant in the tank 15 is already removed of the oil and the moisture, namely, the refrigerant therein is reclaimed. The oil in the oil separator 401 is dropped into an oil storage container 408 by opening a valve 407. Some of the liquefied refrigerant in the moisture exchange chamber 404 flows through a pipe 409 and is then heated to a temperature of 30° C., for example, by a PTC heater 410 so as to be evaporated and flow into a refrigerant recovery vessel 3. This is for detecting the moisture of refrigerant in the moisture exchange chamber 404. The refrigerant in the moisture exchange chamber 404. The refrigerant evaporated by the heating is passed through a moisture indicator 411 attached to the upper portion of the pipe 409, so that the color of the indicator 411 be changed. The moisture of the reclaimed refrigerant is checked in terms of the changed color of the indicator 411. If it is found out from the changed color that the moisture of the reclaimed refrigerant is high, the drying member 406 needs to be replaced. The drying member 406 can be replaced by removing screws 405b and 405c which are for hermetically securing a side plate 405a.

Figure 18:
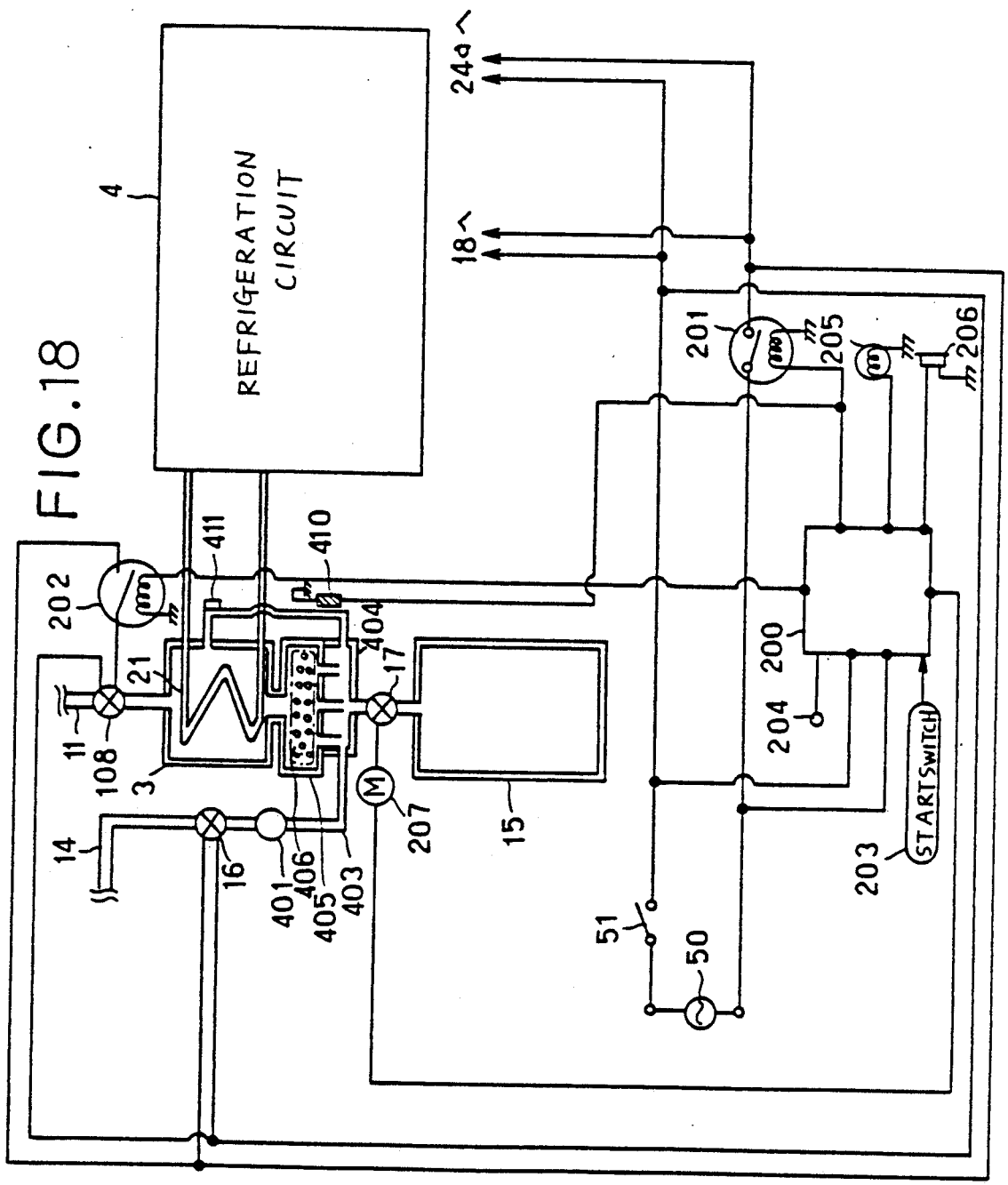
FIG. 18 is a wiring diagram of the electric circuit of the refrigerant recovery and reclaim system.

FIG. 18 is a wiring diagram of the electric mechanism of the refrigerant recovery and reclaim system 400. The electric mechanism is nearly the same as that shown in FIG. 11. The control circuit 200 of the system 400 performs the same operation as that shown in FIG. 11. The difference of the system 400 from the refrigerant recovery system shown in FIG. 11 is that the system 400 further includes the refrigerant reclaim system having the oil separator 401, the moisture exchange chamber 404, the moisture separation chamber 405, the PTC heater 410, the moisture indicator 411 and so forth. An operation signal is supplied to not only the relay 201 but also the PTC heater 410 so that the heater is kept in operation for the same period as the recovery of the refrigerant.

Figure 19:
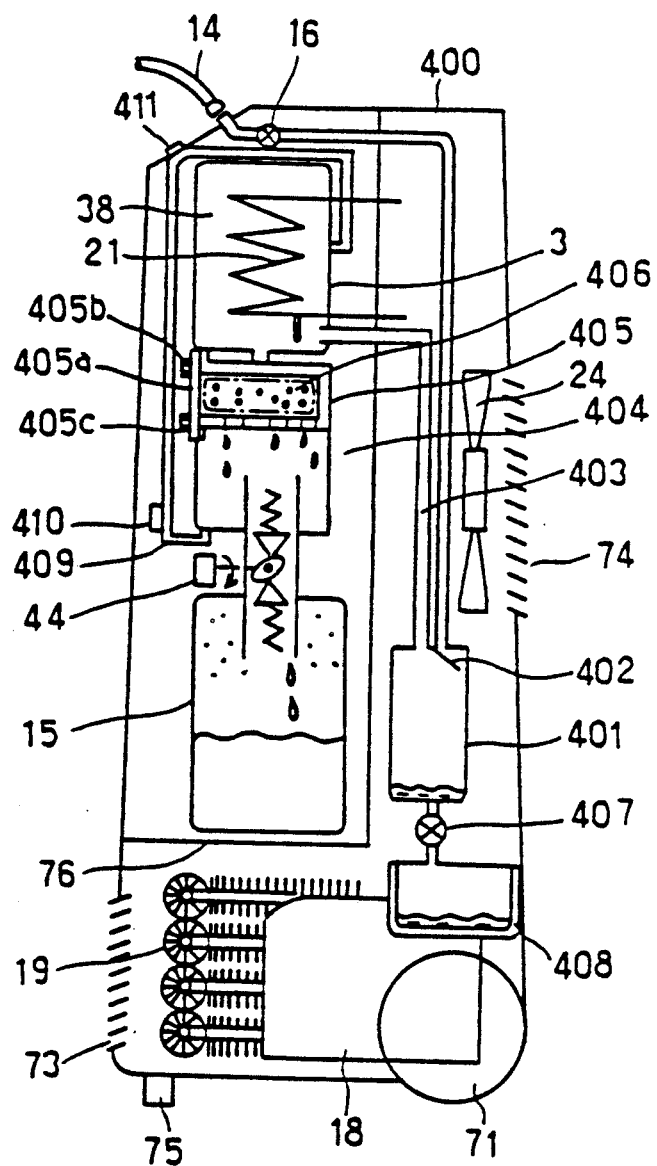
FIG. 19 is a structural view of a refrigerant recovery and reclaim system which is yet another embodiment of the present invention.

FIG. 19 is a schematic view of a refrigerant recovery and regeneration system 400 which is yet another embodiment. The system 400 is nearly the same in constitution and operation as that shown in FIG. 17. The difference of the system 400 from that shown in FIG. 17 is that the system does not have such a moisture exchange section as composed of the pipes 404a, 404b and 404c. In the system 400 shown in FIG. 19, a refrigerant sucked in through a charging hose 14 is removed of oil by the oil separator 401 and then introduced into a condensation chamber 38 in which the refrigerant is liquefied on the surface of ta refrigerant evaporator 21 arranged in a refrigerant recovery vessel 3. If the temperature of the surface of the refrigerant evaporator 21 is not higher than −10° C., the refrigerant can contain only 15 ppm or less of moisture. In that case, moisture above 15 ppm is separated from the refrigerant. The refrigerant with the separated moisture is passed through the drying member 406 in a moisture removal chamber 405 so that the refrigerant is removed of the separated moisture. The refrigerant is thereafter dropped into the tank 15 and stored therein.

What is claimed is:

1. A refrigerant recovery system for recovering a refrigerant from a refrigeration circuit comprising:
    a refrigerant recovery vessel connected to the refrigerant passage of said circuit so that gaseous refrigerant is introduced from said circuit into said vessel;
    cooling means for cooling said gaseous refrigerant in said vessel so that said refrigerant is liquefied;
    a recovery tank which is connected to said vessel and to receive said liquefied refrigerant for evaporating said liquefied refrigerant depending on a difference between an inside temperature of said tank and a temperature of said liquefied refrigerant and for returning said evaporated refrigerant into said vessel and transfer of said liquefied refrigerant from said vessel to said tank again are repeated to lower the inside temperature of said tank for accumulating said liquefied refrigerant;
    a moisture exchanging chamber which receives the gaseous refrigerant from the refrigeration circuit and has pipes through which the gaseous refrigerant from said circuit flows toward the refrigerant recovery vessel and the liquefied refrigerant in said refrigerant recovery vessel flows to the moisture exchanging chamber whereby said gaseous refrigerant and said liquefied refrigerant come into direct contact with each other in said pipes to transfer the moisture in said liquefied refrigerant into said gaseous refrigerant; and
    attach/detach means for attaching and detaching said tank to and from said vessel so that said tank communicates with said vessel, when said tank is attached thereto.

2. A refrigerant recovery system according to the claim 1, wherein the recovery tank has an internal gas space in which gas is held.

3. A refrigerant recovery system according to the claim 1, further comprising:
    air removal means for discharging air from the refrigerant recovery vessel to the outside of said system at prescribed timing.

4. A refrigerant recovery system according to the claim 3, further comprising:
    air detection means for detecting the presence of air in the refrigerant recovery vessel; and
    air removal control means for causing said air removal means to discharge said air from said vessel if it is detected by said detection means that the quantity of said air in said vessel is more than a predetermined level.

5. A refrigerant recovery system according to the claim 3, further comprising:
    timer means for causing the air removal means to discharge the air from the refrigerant recovery vessel to the outside of said system when a predetermined time has passed since the start of the recovery of the refrigerant.

6. A refrigerant recovery system according to claim 1, further comprising:
    a moisture separation chamber provided between the refrigerant recovery vessel and the moisture exchanging chamber so as to remove separated moisture from the liquefied refrigerant flowing from said vessel to said tank.

7. A refrigerant recovery system according to claim 1, wherein
    said recovery tank comprises a body which has an internal space for storing said liquefied refrigerant and has an upper part at which said liquefied refrigerant is received from said refrigerant recovery vessel; and
    a guide provided in the upper internal portion of said body so that vapor arising from said liquefied refrigerant sent from said vessel through said upper part is retained in the upper portion of said tank.

8. A recovery tank according to the claim 7, wherein the guide is a cylindrical guide open at the lower end thereof and extending in the recovery tank downward from the upper end of the body thereof.

* * * * *